United States Patent
Cui et al.

(10) Patent No.: US 9,912,527 B2
(45) Date of Patent: Mar. 6, 2018

(54) COMMUNICATION DEVICE, COMMUNICATION SYSTEM, METHOD FOR DETERMINING PATH, AND PROGRAM

(71) Applicant: NEC Corporation, Tokyo (JP)

(72) Inventors: Zhenlong Cui, Tokyo (JP); Kazuo Takagi, Tokyo (JP); Akira Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 14/416,409

(22) PCT Filed: May 28, 2013

(86) PCT No.: PCT/JP2013/064734
§ 371 (c)(1),
(2) Date: Jan. 22, 2015

(87) PCT Pub. No.: WO2014/017162
PCT Pub. Date: Jan. 30, 2014

(65) Prior Publication Data
US 2015/0207673 A1    Jul. 23, 2015

(30) Foreign Application Priority Data
Jul. 26, 2012 (JP) ................................ 2012-165748

(51) Int. Cl.
*H04L 12/24* (2006.01)
*H04L 12/28* (2006.01)
(Continued)

(52) U.S. Cl.
CPC ...... *H04L 41/0668* (2013.01); *H04L 12/2863* (2013.01); *H04L 41/06* (2013.01);
(Continued)

(58) Field of Classification Search
CPC ..... H04L 41/0668; H04L 41/06; H04L 45/22; H04L 45/28; H04L 12/2863; Y02B 60/33
See application file for complete search history.

(56) References Cited

U.S. PATENT DOCUMENTS 7,406,030 B1 * 7/2008 Rijsman ................. H04L 45/00
370/216
2003/0223357 A1   12/2003 Lee
(Continued)

FOREIGN PATENT DOCUMENTS

CN       1852141 A    10/2006
EP    1 096 712 A2    5/2001
(Continued)

OTHER PUBLICATIONS

S. Ramasubramanian et al., "Dual-Link Failure Resiliency Through Backup Link Mutual Exclusion", IEE/ACM Transactions on Networking, vol. 16, No. 1, pp. 157-169, Feb. 2008.
(Continued)

*Primary Examiner* — Ian N Moore
*Assistant Examiner* — Justin T Van Roie
(74) *Attorney, Agent, or Firm* — Finnegan, Henderson, Farabow, Garrett & Dunner, L.L.P.

(57) ABSTRACT

A communication device communicates with a counterpart device via a working path or any of a plurality of backup paths. The communication device includes: a plurality of selection units which select either one of two paths, the plurality of selection units including a main selection unit and an auxiliary selection unit being different from the main selection unit; and a path determination unit which determines a path selected by one of the plurality of selection units which has last performed path selection to be a path to be used for communicating with the counterpart device. The main selection unit selects one path from between the working path and one of the plurality of backup paths. The
(Continued)

auxiliary selection unit selects one path from between a path selected by one selection unit of the plurality of selection units and one of the plurality of backup paths, the one selection unit being different from the auxiliary selection unit.

4 Claims, 12 Drawing Sheets

(51) Int. Cl.
*H04L 12/707* (2013.01)
*H04L 12/703* (2013.01)

(52) U.S. Cl.
CPC ............... *H04L 45/22* (2013.01); *H04L 45/28* (2013.01); *Y02B 60/33* (2013.01)

(56) References Cited

U.S. PATENT DOCUMENTS

| | | | |
|---|---|---|---|
| 2008/0068988 A1* | 3/2008 | Tochio | H04L 45/22 370/228 |
| 2008/0101362 A1 | 5/2008 | Hu et al. | |
| 2008/0151755 A1 | 6/2008 | Nishioka | |
| 2011/0075670 A1* | 3/2011 | So | H04L 45/00 370/395.1 |
| 2012/0163163 A1 | 6/2012 | Kim et al. | |

FOREIGN PATENT DOCUMENTS

| | | |
|---|---|---|
| EP | 2 259 505 A1 | 12/2010 |
| JP | 9-266474 | 10/1997 |
| JP | 11-32052 | 2/1999 |
| JP | 2010-166328 | 7/2010 |
| JP | 2010-239279 | 10/2010 |

OTHER PUBLICATIONS

L. Song et al., "On the Study of Multiple Backups and Primary-Backup Link Sharing for Dynamic Service Provisioning in Survivable WDM Mesh Networks", IEEE Journal on Selected Areas in Communications, vol. 26, No. 6, pp. 84-91, Aug. 2008.

Extended European Search Report dated May 9, 2016, by the European Patent Office in counterpart European Patent Application No. 13822972.9.

International Search Report and Written Opinion dated Aug. 20, 2013 in corresponding PCT International Application.

Office Action issued by the Chinese Patent Office in counterpart Chinese Patent Application No. 201380039708.1, dated Nov. 7, 2016.

* cited by examiner

Fig. 3

| GROUP | PATH | ATTRIBUTE | INTERNAL STATUS | FAILURE STATUS | MANAGEMENT STATUS |
|---|---|---|---|---|---|
| G1 | FIRST WORKING PATH | W | NR | NONE | NONE |
| G1 | FIRST BACKUP PATH | P | NR | NONE | NONE |
| G1 | SECOND WORKING PATH | W | NR | NONE | NONE |
| G1 | SECOND BACKUP PATH | P | NR | NONE | NONE |

Fig. 4

| IDENTIFICATION INFORMATION ON RECEIVED FRAME | RECEIVING PORT | SWITCHING GROUP |
|---|---|---|
| MAC A | 1 | G1 |
| MAC B | 2 | G2 |

Fig. 5

| SWITCHING GROUP | PATH | FRAME PROCESSING | SELECTION |
|---|---|---|---|
| G1 | FIRST WORKING PATH | D1 | ON |
| G1 | FIRST BACKUP PATH | D2 | OFF |
| G1 | SECOND BACKUP PATH | D3 | OFF |

Fig. 11

| GROUP | CANDIDATE PATH | FRAME LOSS RATE | DELAY | DELAY FLUCTUATION | UTILIZED BANDWIDTH |
|---|---|---|---|---|---|
| G1 | FIRST CANDIDATE PATH | 1e-1 | 1ms | 1e-2ms | 90Mbps |
| G1 | SECOND CANDIDATE PATH | 1e-6 | 1ms | 1e-2ms | 20Mbps |
| G1 | THIRD CANDIDATE PATH | 1e-1 | 1ms | 1e-2ms | 80Mbps |

Fig. 12

| SWITCHING GROUP | PATH (HIGH) | PATH (LOW) | FRAME PROCESSING | SELECTION |
|---|---|---|---|---|
| G1 | FIRST WORKING PATH | – | D1 | ON |
| G1 | FIRST BACKUP PATH | – | D2 | OFF |
| G1 | SECOND BACKUP PATH | FIRST CANDIDATE PATH | D4 | OFF |
| G1 | SECOND BACKUP PATH | SECOND CANDIDATE PATH | D5 | ON |
| G1 | SECOND BACKUP PATH | THIRD CANDIDATE PATH | D6 | OFF |

COMMUNICATION DEVICE, COMMUNICATION SYSTEM, METHOD FOR DETERMINING PATH, AND PROGRAM

CROSS-REFERENCE TO RELATED PATENT APPLICATIONS

This application is a National Stage Entry of International Application No. PCT/JP2013/064734, filed May 28, 2013, which claims priority from Japanese Patent Application No. 2012-165748, filed Jul. 26, 2012. The entire contents of the above-referenced applications are expressly incorporated herein by reference.

TECHNICAL FIELD

The present invention relates to a communication device, a communication system, a method for determining a path, and a program, which are for communicating with a counterpart device via a working path or any of a plurality of backup paths.

BACKGROUND ART

Due to the recent upsurge in data traffic, communication networks have increasingly large transfer capacities. In a communication network, especially in a transport network forming its core, one of the most important issues is to improve reliability.

A transport network accomplishes data communications using a traffic transfer path which is made up of nodes and links. Thus, a network will fail to transfer data when a failure occurs at any node or link. Reliability of a transport network is expressed by a period from the time an active transmit/receive node becomes unable to communicate to the time it is enabled again, i.e. a period for a path to recover from failure. In general transport networks, a path is required to recover from failure within 50 milliseconds.

Mechanisms for a transport network to recover from failure include two schemes: protection and restoration.

In a protection scheme, a backup path which does not cross the working path used for normal traffic transfer is preset, and in case of a failure on the working path, transmit/receive nodes are switched so that the path used for traffic transfer is switched to the backup path. For example, the Ethernet® Linear Protection scheme as defined in ITU-T G.8031 is generally known. This scheme allows automatic switching caused by failure as well as manual switching for maintenance, etc.

In a restoration scheme, a backup path is defined after a failure occurs on the working path, and thus not only transmit/receive nodes but also relay nodes are switched. In general, a restoration scheme includes a scheme where a path is redefined via NMS (Network Management System) after detection of a failure, and also includes a scheme where individual nodes autonomously redefine a path by using a path definition protocol. A restoration scheme allows to continue data communication as far as a fault-free path exists even if a failure occurs simultaneously both on the working and backup paths.

If a restoration scheme is used, a time required for a path to recover from failure is the same as that for additionally defining one new path. Thus, a path failure recovery time based on a restoration scheme is often longer than 50 milliseconds, which is the time required in a transport network as a path failure recovery time.

Accordingly, a protection scheme is preferable in order to quickly recover from a failure.

Some network users such as government agencies and banks demand particularly high reliability. Thus, there exists the need for a mechanism which allows fast and reliable recovery of user data even when a failure occurs both on the working and backup paths. Consequently, a transport network is required to provide two or more backup paths for one working path.

PTL 1 and PTL 2 each disclose a method for quickly switching between paths in a communication system that provides two or more backup paths for one working path.

PTL 1 discloses a technique for switching to a backup path in case of a failure on the working path by selecting two fault-free paths from among three or more paths and carrying out a conventional protection protocol between the two paths.

PTL 2 discloses a technique for defining four paths as a first working path, a first backup path, and a second working path, a second backup path, respectively, and carrying out a conventional protection protocol between the first working path and the first backup path and between the second working path and the second backup path.

CITATION LIST

Patent Literature

[PTL 1]: Japanese Unexamined Patent Application Publication No. 2010-239279
[PTL 2]: Japanese Unexamined Patent Application Publication No. 2010-166328

SUMMARY OF INVENTION

Technical Problem

However, in case of a simultaneous failure on two paths subject to a protection protocol, neither of the techniques described in PTL 1 and PTL 2 allows to carry out the protection protocol between any of the paths and another path. Thus, there is a problem in that data cannot be transferred for purposes such as maintenance.

A possible alternative way may be defining a new protection protocol which allows switching among multiple paths instead of a conventional protection protocol for switching between two paths, and performing path switching based on the new protocol. However, in this case, there is a problem in that path selection based on a conventional protection protocol for switching between two paths is prevented in a communication system which provides two or more backup paths for one working path.

One example of objectives of the present inventions is to provide a communication device, a communication system, a method for determining a path, and a program which overcome the above-described problems.

Solution to Problem

A communication device according to an embodiment of the present invention communicates with a counterpart device via a working path or any of a plurality of backup paths and includes: a plurality of selection units which select either one of two paths, the plurality of selection units including a main selection unit and an auxiliary selection unit being different from the main selection unit; and a path determination unit which determines a path selected by one of the plurality of selection units which has last performed path selection to be a path to be used for communicating with the counterpart device. The main selection unit selects one path from between the working path and one of the plurality of backup paths. The auxiliary selection unit selects one path from between a path selected by one selection unit of the plurality of selection units and one of the plurality of backup paths, the one selection unit being different from the auxiliary selection unit.

A communication device according to an embodiment of the present invention communicates with a counterpart device via a working path, a first backup path, or a second backup path, and includes: a main selection unit which selects one path from between the working path and the first backup path; an auxiliary selection unit which selects one path from between a path selected by the main selection unit and the second backup path; and a path determination unit which determines a path selected by the auxiliary selection unit to be a path to be used for communicating with the counterpart device.

A communication system according to an embodiment of the present invention includes two communication devices being opposite to each other and communicating with each other via a working path or any of a plurality of backup paths. Each of the two communication devices includes: a plurality of selection units which select either one of two paths, the plurality of selection units including a main selection unit and an auxiliary selection unit being different from the main selection unit; and a path determination unit which determines a path selected by one of the plurality of selection units which has last performed path selection to be a path to be used for communicating with an opposite communication device. The main selection unit selects one path from between the working path and one of the plurality of backup paths. The auxiliary selection unit selects one path from between a path selected by one selection unit of the plurality of selection units and one of the plurality of backup paths, the one selection unit being different from the auxiliary selection unit.

A communication system according to an embodiment of the present invention includes two communication devices being opposite to each other and communicating with each other via a working path, a first backup path, or a second backup path. Each of the two communication devices includes: a main selection unit which selects one path from between the working path and the first backup path; an auxiliary selection unit which selects one path from between a path selected by the main selection unit and the second backup path; and a path determination unit which determines a path selected by the auxiliary selection unit to be a path to be used for communicating with an opposite communication device.

A method for determining a path according to an embodiment of the present invention employs a communication device which communicates with a counterpart device via a working path or any of a plurality of backup paths. The method for determining a path includes: selecting one path from between the working path and one of the plurality of backup paths, the selecting being made by a main selection unit which is one of selection units; selecting, being made by an auxiliary selection unit which is a selection unit different from the main selection unit, one path from between a path selected by a selection unit being different from the auxiliary selection unit and one of the plurality of backup paths; and determining a path selected by one of the selection units which has last performed path selection to be a path to be used for communicating with the counterpart device.

A method for determining a path according to an embodiment of the present invention employs a communication device which communicates with a counterpart device via a working path, a first backup path, or a second backup path. The method for determining a path includes: selecting one path from between the working path and the first backup path, the selecting being made by a main selection unit; selecting one path from between a path selected by the main selection unit and the second backup path, the selecting being made by an auxiliary selection unit; and determining a path selected by the auxiliary selection unit to be a path to be used for communicating with the counterpart device.

A program according to an embodiment of the present invention causes a computer for a communication device which communicates with a counterpart device via a working path or any of a plurality of backup paths to function as: a plurality of selection units which select either one of two paths, the plurality of selection units including a main selection unit and an auxiliary selection unit being different from the main selection unit; and a path determination unit which determines a path selected by one of the plurality of selection units which has last performed path selection to be a path to be used for communicating with the counterpart device. The main selection unit selects one path from between the working path and one of the plurality of backup paths. The auxiliary selection unit selects one path from between a path selected by one selection unit of the plurality of selection units and one of the plurality of backup paths, the one selection unit being different from the auxiliary selection unit.

A program according to an embodiment of the present invention causes a computer for a communication device which communicates with a counterpart device via a working path, a first backup path, or a second backup path to function as: a main selection unit which selects one path from between the working path and the first backup path; an auxiliary selection unit which selects one path from between a path selected by the main selection unit and the second backup path; and a path determination unit which determines a path selected by the auxiliary selection unit to be a path to be used for communicating with the counterpart device.

Advantageous Effects of Invention

According to the present invention, each selection unit sequentially selects from two paths, and the path determination unit determines the last selected path to be the path to be used for communication. This enables a communication device in a communication system providing two or more backup paths for one working path to select a path based on a protection protocol for switching between two paths.

BRIEF DESCRIPTION OF DRAWINGS

FIG. 3 represents an example of a switching information table according to the first embodiment of the present invention.

FIG. 4 represents an example of a transfer table according to the first embodiment of the present invention.

FIG. 5 represents an example of a path selection table according to the first embodiment of the present invention.

FIG. 11 represents an example of a performance monitoring table according to the second embodiment of the present invention.

FIG. 12 represents an example of a path selection table according to the second embodiment of the present invention.

DESCRIPTION OF EMBODIMENTS

<Basic Configuration>

Embodiments of the present invention will now be explained in detail below with reference to the drawings.

Figure 1:
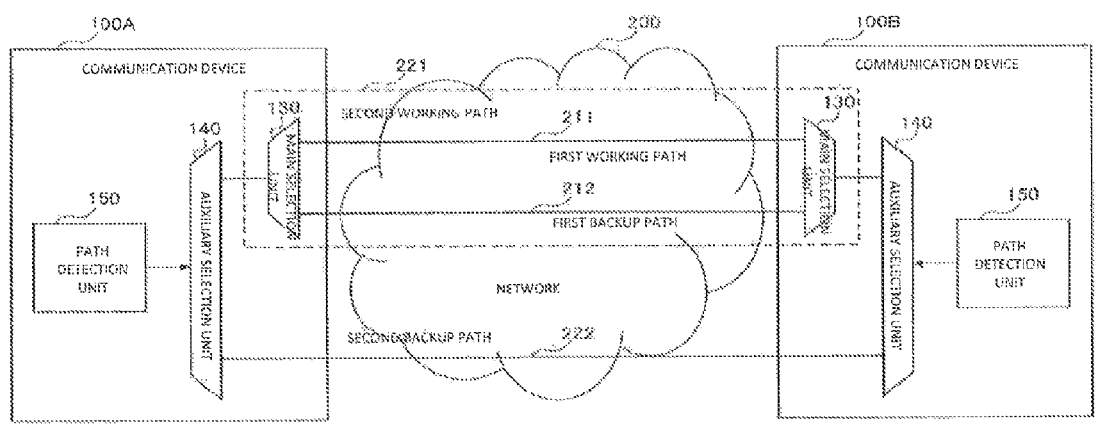
FIG. 1 is a schematic block diagram illustrating a basic configuration of a communication system according to an embodiment of the present invention.

FIG. 1 is a schematic block diagram illustrating a basic configuration of a communication system according to an embodiment of the present invention.

The communication system according to this embodiment includes a communication device 100A, a communication device 100B, and a network 200. The communication devices 100A and 100B are hereinafter simply called communication device 100 unless separate explanations are needed.

The network 200 has a first working path 211 (the working path), a first backup path 212, and a second backup path 222. Each of the paths 211, 212, and 222 is an independent path non-crossing one another.

The communication devices 100A and 100B are connected with each other via the network 200. The communication device 100A (or communication device 100B) selects a suitable path from among the first working path 211, the first backup path 212, and the second backup path 222 to transfer user data to the opposite communication device 100B (or communication device 100A).

Each of the communication devices 100A and 100B includes a main selection unit 130, an auxiliary selection unit 140, and a path determination unit 150.

The main selection unit 130 is connected to the first working path 211 and to the first backup path 212. The main selection unit 130 automatically switches between paths according to a protection protocol.

The auxiliary selection unit 140 is connected to the main selection unit 130 and to the backup path 222. The auxiliary selection unit 140 automatically switches paths according to a protection protocol. In other words, the auxiliary selection unit 140 regards a combination of the first working path 211 and the first backup path 212 as a second working path 221, and automatically switches between the second working path 221 and the second backup path 222.

The path determination unit 150 determines a path selected by the auxiliary selection unit 140 to be a path to be used for communicating with the opposite communication device 100.

Thus, the communication device 100 according to an embodiment of the present invention has a basic configuration which enables to automatically switch among three or more paths by providing multiple selection units (the main selection unit 130 and the auxiliary selection unit 140) that carry out a protection protocol. Each selection unit selects a path using 1:1 protection or 1+1 protection.

This basic configuration is an example where one auxiliary selection unit 140 overlaps with the main selection unit 130, but configurations are not limited to this. Alternatively, an N:1 switching system may be possible such that the communication device 100 includes a plurality of auxiliary selection units 140, and one auxiliary selection unit 140 overlaps with another auxiliary selection unit 140.

Embodiments of the present invention will now be explained below.

First Embodiment

Figure 2:
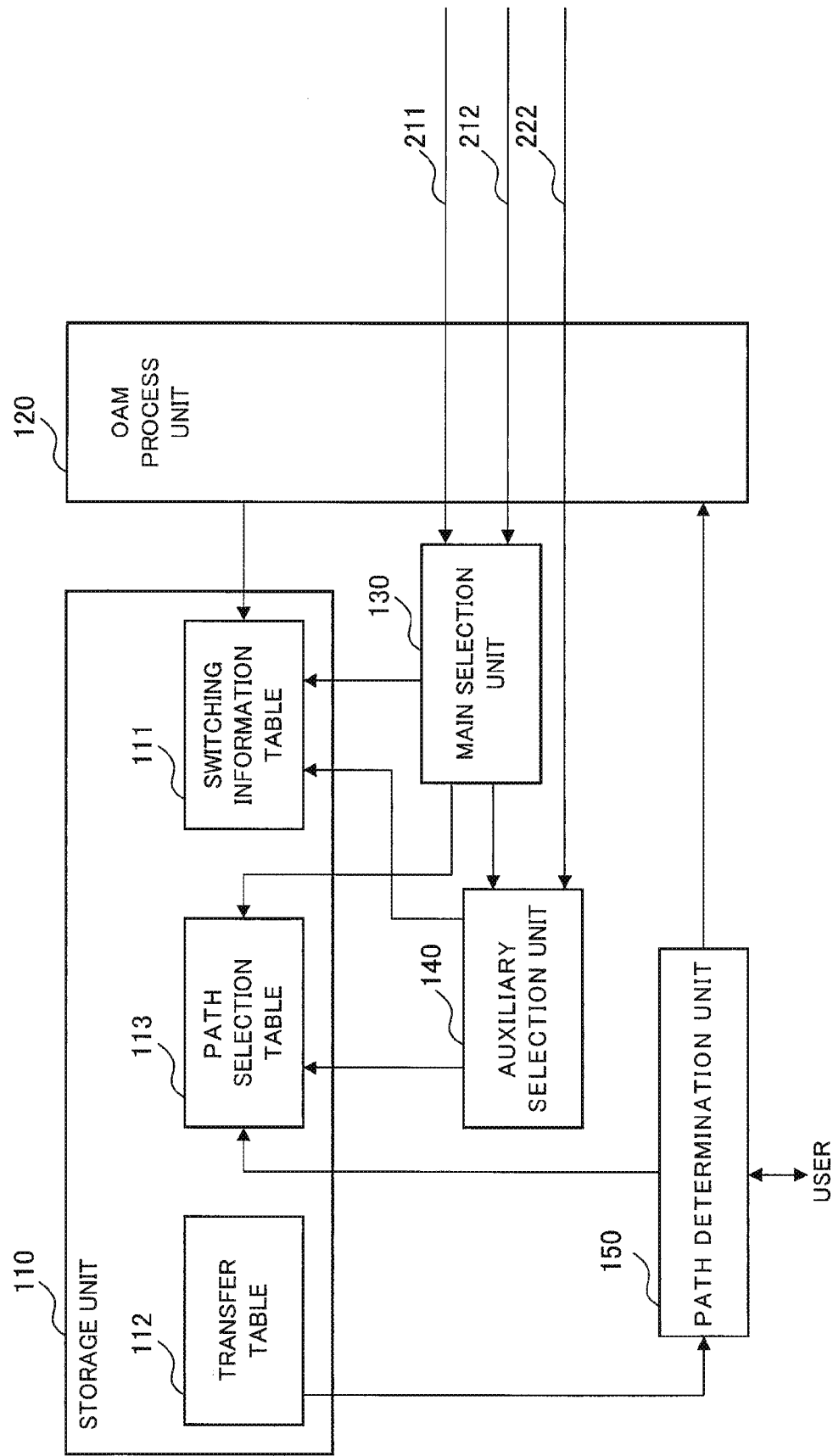
FIG. 2 is a schematic block diagram illustrating a configuration of a communication device according to a first embodiment of the present invention.

FIG. 2 is a schematic block diagram illustrating a configuration of a communication device 100 according to a first embodiment of the present invention.

The communication device 100 includes a storage unit 110, an OAM (operation admission and maintenance) process unit 120, a main selection unit 130, an auxiliary selection unit 140, and a path determination unit 150. The communication devices 100A and 100B illustrated in the basic configuration in FIG. 1 are configured similarly to the communication device 100 shown in FIG. 2.

The storage unit 110 stores a switching information table 111, a transfer table 112, and a path selection table 113.

FIG. 3 represents an example of the switching information table 111 according to the first embodiment of the present invention.

The switching information table 111 stores identification information on a switching group and information about the group's associated members including path, path attribute, internal status, and management status. A switching group represents a group of paths among which switching will be done. Note that in this embodiment the first working path 211, the first backup path 212, and the second backup path 222 belong to the same switching group. Path attributes include, for example, path numbers and designations such as working (W: Working) and backup (P: Protection). Path internal status includes, for example, values defined as internal status of APS (auto protection switching) such as NR (No Request) and FS (Force Switch).

FIG. 4 represents an example of the transfer table 112 according to the first embodiment of the present invention.

The transfer table 112 will be referenced during selection of a switching group needed for transferring data between a user and the network 200. As shown in FIG. 4, the transfer table 112 stores, for example, identification information on the switching group for transfer with keys, i.e., identification information on a frame received from the user and information on a receiving port.

FIG. 5 represents an example of the path determination table 113 according to the first embodiment of the present invention.

The path selection table 113 stores the information indicating frame processing (for example, overhead Encapsulation/Decapsulation) required when data is transferred between a user and the network 200 as well as the information indicating which path should be used for data transfer. As shown in FIG. 5, the path selection table 113 stores, for example, the information about frame processing required for transfer along the applicable path as well as the information about the path for transfer with keys, i.e., identification information on a switching group and identification information on a path.

The OAM process unit 120 performs monitoring management on the first working path 211, the first backup path 212, and the second backup path 222, and stores results of the monitoring management into the switching information table 111 in the storage unit 110. At the same time, the OAM process unit 120 notifies the main selection unit 130 of results of the monitoring management on the first working path 211 and the first backup path 212, while notifying the auxiliary selection unit 140 of results of the monitoring management on the second backup path 222.

The main selection unit 130 selects a suitable path according to a protection protocol, based on failure status on the first working path 211 and the first backup path 212 or on administrator settings. Specifically, the main selection unit 130 determines the APS internal status by using the top priority input information to select a path, based on information such as the input information including failure status on the first working path 211 and the first backup path 212 as received from the OAM process unit 120 as well as controls from the administrator. The input information includes, in priority order, Forced Switch Request, Signal Failure (SF), Signal Degrade (SD), and Manual Switch Request. For example, if the APS internal status of the first working path 211 is "NR", the main selection unit 130 selects the first working path 211 as the transfer path. On the other hand, if the APS internal status of the first working path 211 is "W-SF (Working Signal Failure)", which indicates a failure, the main selection unit 130 selects the first backup path 212 as the transfer path.

If the determined APS internal status is different from the internal status in the switching information table 111, the main selection unit 130 updates the switching information table 111. In addition, the main selection unit 130 sends a switch control message informing of the change in the internal status to the opposite communication device 100 via the network 200.

Upon detection of a failure both on the first working path 211 and the first backup path 212, the main selection unit 130 issues to the auxiliary selection unit 140 a failure notice informing that a failure has occurred. For example, if the APS internal status of the first backup path 212 is "P-SF", the main selection unit 130, upon receipt of "W-SF" indicating a failure on the first working path 211 from another main selection unit 130, issues a failure notice to the auxiliary selection unit 140 informing that a failure has occurred on a second working path 221, which is a combination of the first working path 211 and the first backup path 212.

After the failure notice is issued, upon recovery from the failure on either the first working path 211 or the first backup path 212, the main selection unit 130 sends a failure recovery notice to the auxiliary selection unit 140 informing that the path has recovered from the failure.

The auxiliary selection unit 140 selects a suitable path according to a protection protocol, based on failure status on the second working path 221 and the second backup path 222 or on administrator settings. The auxiliary selection unit 140 also selects a path based on notices of failure and failure recovery received from the main selection unit 130. Specifically, the auxiliary selection unit 140 determines the APS internal status by using the top priority information to select a path, based on information such as notices of failure and failure recovery on the second working path 221 received from the main selection unit 130 as well as failure status on the second backup path 222 received from the OAM process unit 120.

Like the main selection unit 130, the auxiliary selection unit 140 updates the switching information table 111 if the determined APS internal status is different from the internal status in the switching information table 111. In addition, the auxiliary selection unit 140 sends a switch control message informing of the change in the internal status to the opposite communication apparatus 100 via the network 200. For example, if the APS internal status of the second working path 221 is "NR", the auxiliary selection unit 140 selects the second working path 221 as the transfer path. On the other hand, if the APS internal status of the second working path 221 is "W-SF", the auxiliary selection unit 140 selects the second backup path 222 as the transfer path.

The path determination unit 150 references the switching information table 111 and the transfer table 112, and transfers user data from a user or other data that includes the user data to the opposite communication device 100 via one suitable path among the first working path 211, the first backup path 212, and the second backup path 222. In addition, the path determination unit 150 references the switching information table 111, the transfer table 112, and the path selection table 113, and transfers data sent from the opposite communication device 100 to the user.

Now, operations of the communication device 100 according to this embodiment will be explained.

The OAM process unit 120 in the communication device 100 periodically monitors for failure status on the first working path 211, the first backup path 212, and the second backup path 222, and updates the switching information table 111 stored in the storage unit 110 based on monitoring results. At the same time, if the OAM process unit 120 detects any failure on the first working path 211 or the first backup path 212, the unit 120 notifies the main selection unit 130 that a failure has occurred. On the other hand, if the OAM process unit 120 detects any failure on the second backup path 222, the unit 120 notifies the auxiliary selection unit 140 that a failure has occurred. If the OAM process unit 120 receives an APS frame from the first backup path 212, the unit 120 transfers the APS frame to the main selection unit 130. If the OAM process unit 120 receives an APS frame from the second backup path 222, the unit 120 transfers the APS frame to the auxiliary selection unit 140.

Figure 6:
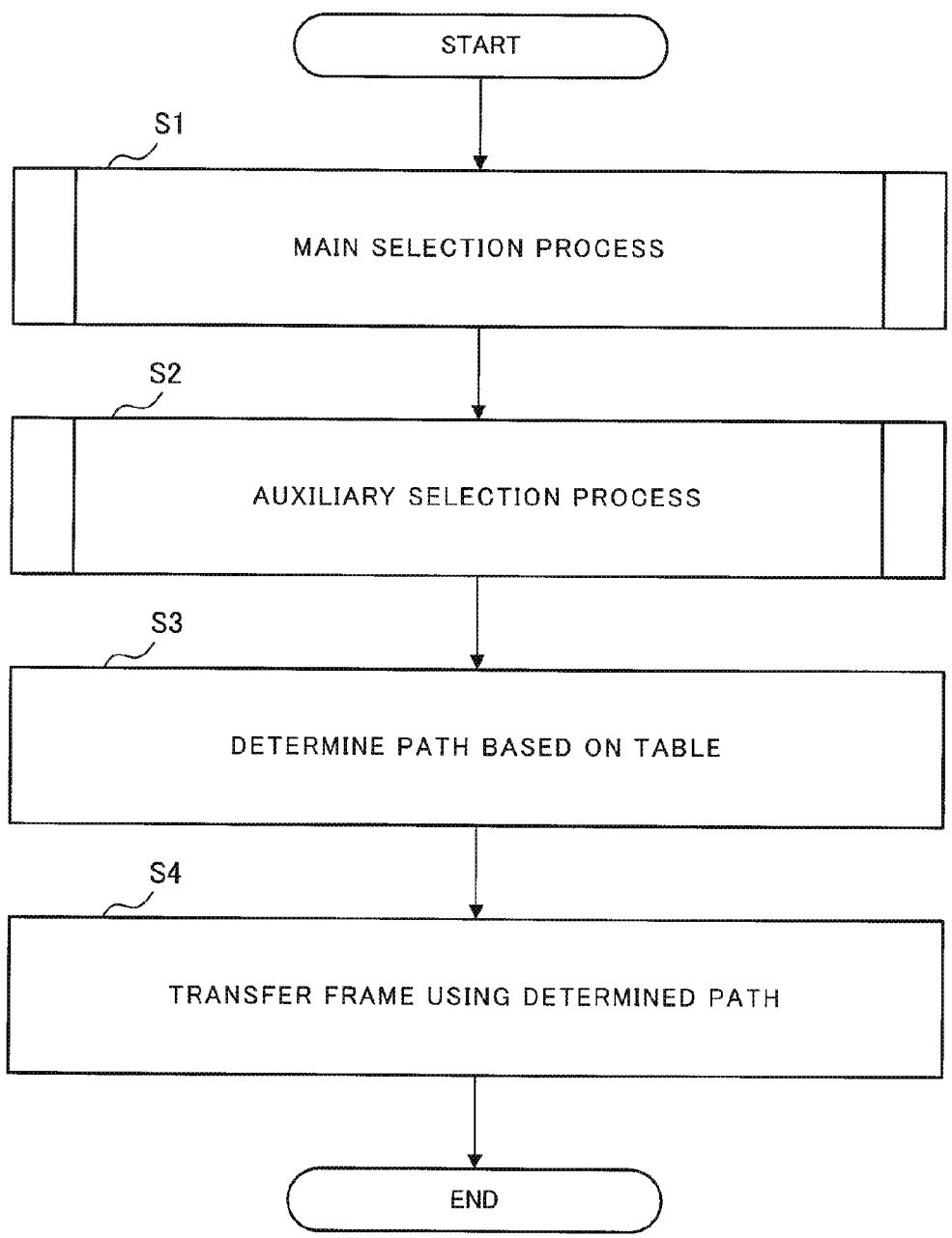
FIG. 6 is a flowchart illustrating operations of a communication device according to the first embodiment of the present invention.

FIG. 6 is a flowchart illustrating operations of the communication device 100 according to the first embodiment of the present invention.

To transfer user data to the opposite communication devices 100, the main selection unit 130 first executes the main selection process to select one path from between the first working path 211 and the first backup path 212 (Step S1).

Figure 7:
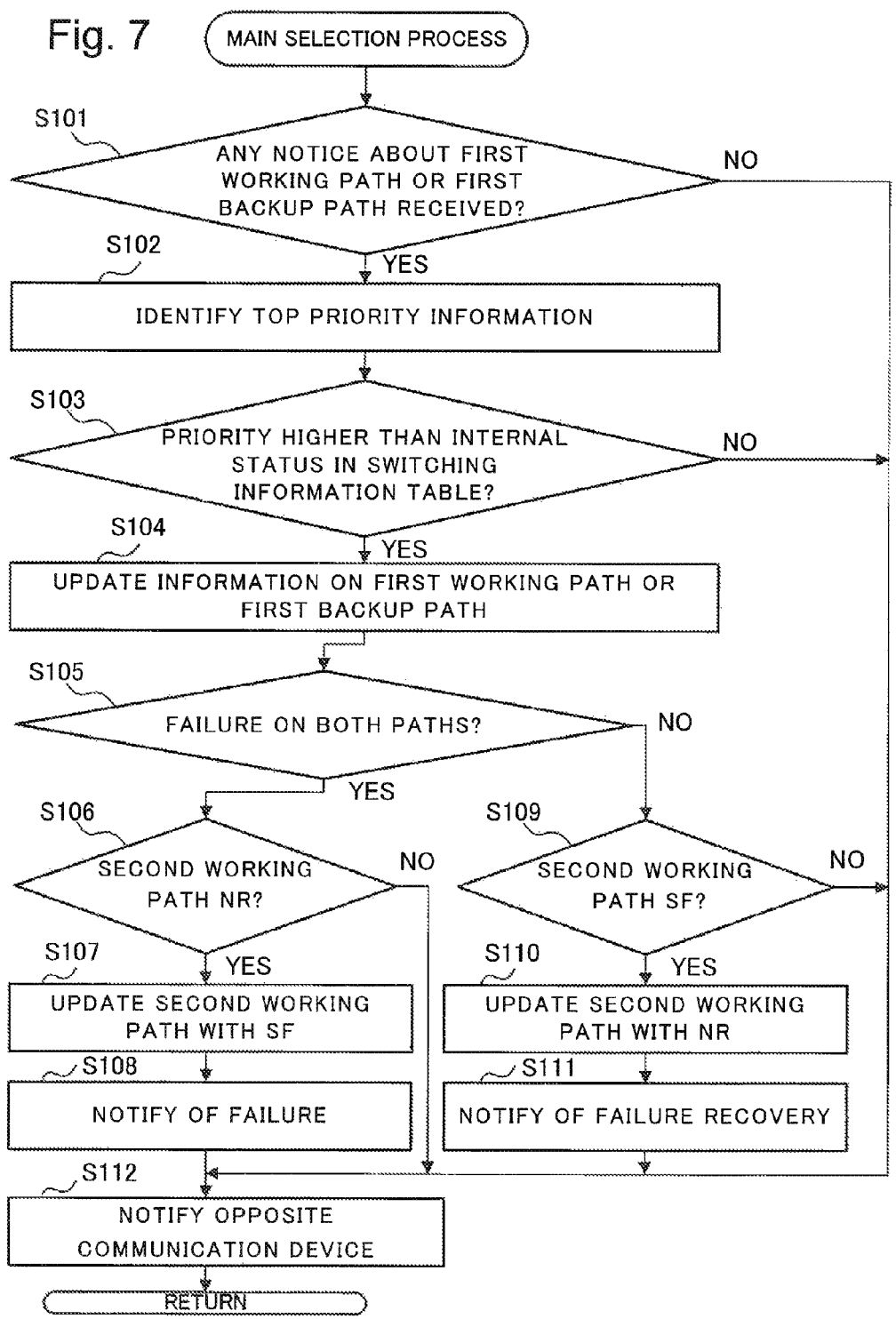
FIG. 7 is a flowchart illustrating operations of a main selection process in a communication device according to the first embodiment of the present invention.

FIG. 7 is a flowchart illustrating operations of the main selection process in the communication device 100 according to the first embodiment of the present invention.

Upon starting the main selection process, the main selection unit 130 first determines whether it has received any notice about the first working path 211 or the first backup path 212 from the OAM process unit 120 or from the administrator (Step S101). Notices about the first working path 211 or the first backup path 212 include a notice of failure occurrence or an APS frame received from the OAM process 120, or an administrator control notice received from the administrator. If the main selection unit 130 determines that it has received a notice about the first working path 211 or the first backup path 212 (Step S101: YES), the unit 130 identifies the top priority information among notices received (Step S102).

Then, the main selection unit 130 compares the priority of the identified information with the priority of the internal status stored in the switching information table 111 to determine whether the identified information has a higher priority or not (Step S103). If the main selection unit 130 determines that the identified information has a higher priority (Step S103: YES), the unit 130 updates the information about the first working path 211 or the first backup path 212 in each table stored in the storage unit 110 with the identified information (Step S104). Such update of tables is done based on a general protection protocol.

By way of example, an update to the path selection table 113 is described below. First, the main selection unit 130 references information about the internal status of the first working path 211 to determine whether any failure has occurred on the first working path 211. When the main selection unit 130 determines that no failure has occurred on the first working path 211, the unit 130 sets, in the path selection table 113, "Selection" associated with the first working path 211 to "ON", and sets "Selection" associated with the first backup path 212 to "OFF." On the other hand, when the main selection unit 130 determines that a failure has occurred on the first working path 211, the unit 130 sets, in the path selection table 113, "Selection" associated with the first working path 211 to "OFF". In addition, the main selection unit 130 determines whether any failure has occurred on the first backup path 212. When the main selection unit 130 determines that no failure has occurred on the first backup path 212, the unit 130 sets "Selection" associated with the first backup path 212 to "ON." On the other hand, when the main selection unit 130 determines that a failure has occurred on the first backup path 212, the unit 130 sets "Selection" associated with the first backup path 212 to "OFF." The main selection unit 130 updates other tables in a similar manner.

Then, the main selection unit 130 references information about the internal status stored in the switching information table 111 to determine whether a failure has occurred both on the first working path 211 and on the first backup path 212 (Step S105).

When the main selection unit 130 determines that a failure has occurred on both of the paths (Step S105: YES), the unit 130 determines whether the internal status of the second working path 221 is "NR", which indicates being normal, as stored in the switching information table 111 (Step S106).

If the internal status of the second working path 221, as stored in the switching information 111, is "NR" (Step S106: YES), the main selection unit 130 rewrites the information about the internal status of the second working path 221, as stored in the switching information table 111, with "SF" to indicate that a failure exists (Step S107), and then issues a failure notice to the auxiliary selection unit 140 (Step S108).

On the other hand, when the main selection unit 130 determines in S105 that no failure has occurred on at least one of the paths (Step S105: NO), the unit 130 determines whether the internal status of the second working path 221 is "SF", which indicates existence of a failure, as stored in the switching information table 111 (Step S109).

When the main selection unit 130 determines that the internal status of the second working path 221, as stored in the switching information table 111, is "SF" (Step S109: YES), the unit 130 rewrites the information about the internal status of the second working path 221, as stored in the switching information table 111, with "NR", which indicates being normal (Step S110). In addition, the main selection unit 130 issues a failure recovery notice to the auxiliary selection unit 140 (Step S111).

In any of the following circumstances, the main selection unit 130 immediately notifies the opposite communication device 100 of the APS status (Step S112), and then quits the main selection process: a first circumstance where the main selection unit 130 has given a failure or failure recovery notice to the auxiliary selection unit 140; a second circumstance where the main selection unit 130 has determined that the internal status of the second working path 221 is "SF" in Step S106 (Step S106: NO); or a third circumstance where the main selection unit 130 has determined that the internal status of the second working path 221 is "NR" in Step S109 (Step S109: NO).

The main selection unit 130 also notifies the opposite communication device 100 of the APS status (Step S112) if the unit 130 has not received any notice about the first working path 211 or the first backup path 212, as determined in S101 (Step S101: NO), or if the identified information has a lower priority, as determined in Step S103 (Step S103: NO). However, in these cases, the main selection unit 130 gives notices at predetermined intervals, not immediately.

Referring back to FIG. 6, after the main selection unit 130 carries out the main selection process, the auxiliary selection unit 140 executes the auxiliary selection process where a path is selected from between the second working path 221, which is a combination of the first working path 211 and the first backup path 212, and the second backup path 222 (Step S2).

Figure 8:
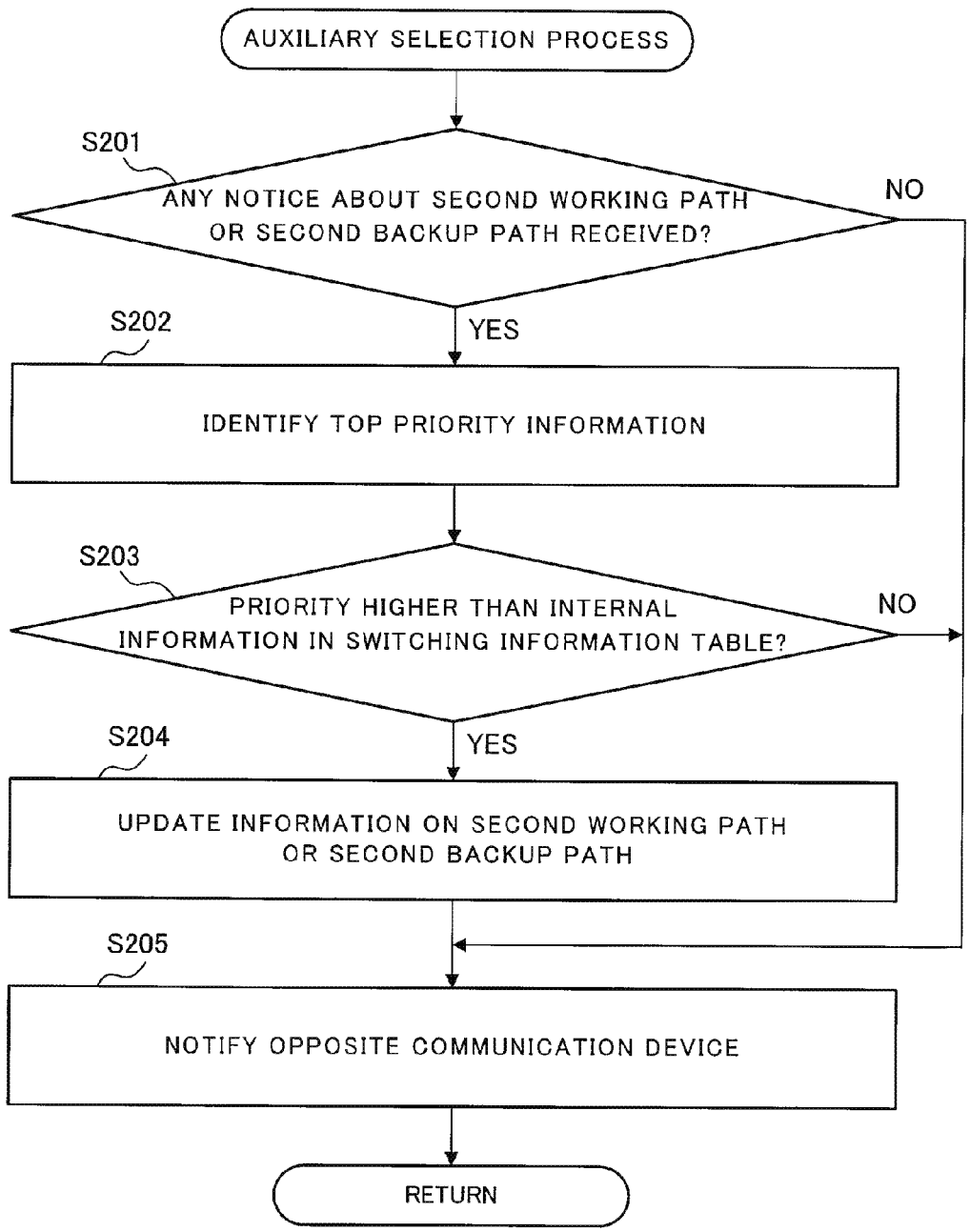
FIG. 8 is a flowchart illustrating operations of an auxiliary selection process in a communication device according to the first embodiment of the present invention.

FIG. 8 is a flowchart illustrating operations of the auxiliary selection process in the communication device 100 according to the first embodiment of the present invention.

Upon starting the auxiliary selection process, the auxiliary selection unit 140 first determines whether it has received any notice about the second working path 221 or the second backup path 222 from the OAM process unit 120, the main selection unit 130, or the administrator (Step S201). Notices about the second working path 221 or the second backup path 222 include a notice of failure occurrence or an APS frame received from the OAM process 120, a notice of failure occurrence or failure recovery received from the main selection unit 130, or an administrator control notice received from the administrator. If the auxiliary selection unit 140 determines that it has received a notice about the second working path 221 or the second backup path 222 (Step S201: YES), the unit 140 identifies the top priority information among notices received (Step S202).

Then, the auxiliary selection unit 140 compares the priority of the identified information with the priority of the information about the internal status stored in the switching information table 111 to determine whether the identified information has a higher priority or not (Step S203). If the auxiliary selection unit 140 determines that the identified information has a higher priority (Step S203: YES), the unit 140 updates the information about the second working path 221 or the second backup path 222 in each table stored in the storage unit 110 with the identified information (Step S204). Such update of tables is done based on a general protection protocol.

By way of example, an update to the path selection table 113 is described below. First, the auxiliary selection unit 140 references information about the internal status of the second working path 221 to determine whether any failure has occurred on the second working path 221. When the auxiliary selection unit 140 determines that no failure has occurred on the second working path 221, the unit 140 sets, in the path selection table 113, "Selection" associated with the second backup path 222 to "OFF." When the auxiliary selection unit 140 determines that a failure has occurred on the second working path 221, the unit 140 determines whether any failure has occurred on the second backup path 222. When the auxiliary selection unit 140 determines that no failure has occurred on the second backup path 222, the unit 140 sets "Selection" associated with the second backup path 222 to "ON." On the other hand, when the auxiliary selection unit 130 determines that a failure has occurred on the second backup path 222, the unit 130 sets "Selection" associated with the second backup path 222 to "OFF." In other words, "Selection" associated with the second backup path 222 is set to "ON" if a failure has occurred both on the first working path 211 and on the first backup path 212, namely the paths to be selected by the main selection unit 130 in the previous stage. The auxiliary selection unit 140 updates other tables in a similar manner.

The auxiliary selection unit 140 immediately notifies the opposite communication device 100 of the APS status (Step S205), and then quits the auxiliary selection process.

The auxiliary selection unit 140 also notifies the opposite communication device 100 of the APS status (Step S205) if the unit 140 has not received any notice about the second working path 221 or the second backup path 222, as determined in S201 (Step S201: NO), or if the identified information has a lower priority, as determined in Step S203 (Step S203: NO). However, in these cases the auxiliary selection unit 140 gives notices at predetermined intervals, not immediately.

Referring back to FIG. 6, after the auxiliary selection unit 140 carries out the auxiliary selection process, the path determination unit 150 references the transfer table 112 and the path selection table 113. The path determination unit 150 performs a necessary frame processing, and then transfers the frame to a suitable path (Step S3). For example, if the path determination unit 150 receives a user frame of "destination MAC address=A" from UNI (User-Network Interface), the unit 150 references the transfer table 112 using the destination MAC address in the received frame and the receiving port of the frame as keys, and retrieves G1, which is an identifier for the applicable switching group. Then, the path determination unit 150 references the path determination table 113 using the switching group identifier G1 as a search key, and retrieves an entry having selection information set to "ON." For example, as shown in FIG. 5, the path selection table 113 includes G1 groups among which the first working path 211 has a setting "Selection=ON." Accordingly, the path determination unit 150 retrieves a path identifier of the applicable entry and obtains processing information for its frame. In addition, the path determination unit 150 performs a necessary frame processing based on the information, and then transfers the frame to the applicable path. The frame is sent to the opposite communication device 100 via the network 200.

When transferring a frame received from the network 200 to a user, the path determination unit 150 references the transfer table 112 and the path selection table 113, performs a necessary frame processing, and then transfers the user frame to UNI. For example, as shown in FIG. 5, the path selection table 113 includes G1 groups among which the first working path 211 has a setting "Selection=ON." Accordingly, the communication device 100 receives the frame only from the first working path 211 among the first working path 211, the first backup path 212, and the second backup path 222, and performs a necessary frame processing. Then, the path determination unit 150 references the transfer table 112 to obtain the receiving port number 1, which has the corresponding group identifier G1, and transfers the frame to the UNI port. In the transfer table 112 shown in FIG. 4, an identifier for a received frame is used as a search key to transfer a frame received from UNI to NNI (Network-Network Interface). On the other hand, to transfer a frame in the opposite direction, a group identifier in the transfer table 112 is used as a search key.

In this way, according to this embodiment, the main selection unit 130 rewrites information about the first working path 211 and the first backup path 212 in a table stored in the storage unit 110, based on a protection protocol. The auxiliary selection unit 140 rewrites information about the second working path 221, which is a combination of the first working path 211 and the first backup path 212, and about the second backup path 222 in a table stored in the storage unit 110, based on a protection protocol. The path determination unit 150 determines a path based on the information in the table rewritten by the main selection unit 130 and the auxiliary selection unit 140.

At this time, if the auxiliary selection unit 140 has rewritten the table so that the second working path 221 will be selected, the path determination unit 150 uses the second working path 221, namely either the first working path 211 or the first backup path 212, to perform communication. On the other hand, if the auxiliary selection unit 140 has rewritten the table so that the second backup path 222 will be selected, the path selection unit 150 uses the second backup path 222 to perform communication. Thus, the path determination unit 150 selects the path selected by the auxiliary selection unit 140 as a path to be used for communication.

This enables the communication device 100 to select a path using a protection protocol for switching between two paths in a communication system which provides two or more backup paths for one working path. Note that the path selection using a protection protocol for switching between two path allows to operate based on a conventional protection protocol. Thus, in case of a simultaneous failure on the first working path 211 and the first backup path 212, the communication device 100 can automatically switch the user data path to the second backup path 222 quickly. Furthermore, the communication device 100 can temporarily move data to the second backup path 222 for purposes such as maintenance.

Second Embodiment

A second embodiment of the present invention will now be explained.

Figure 9:
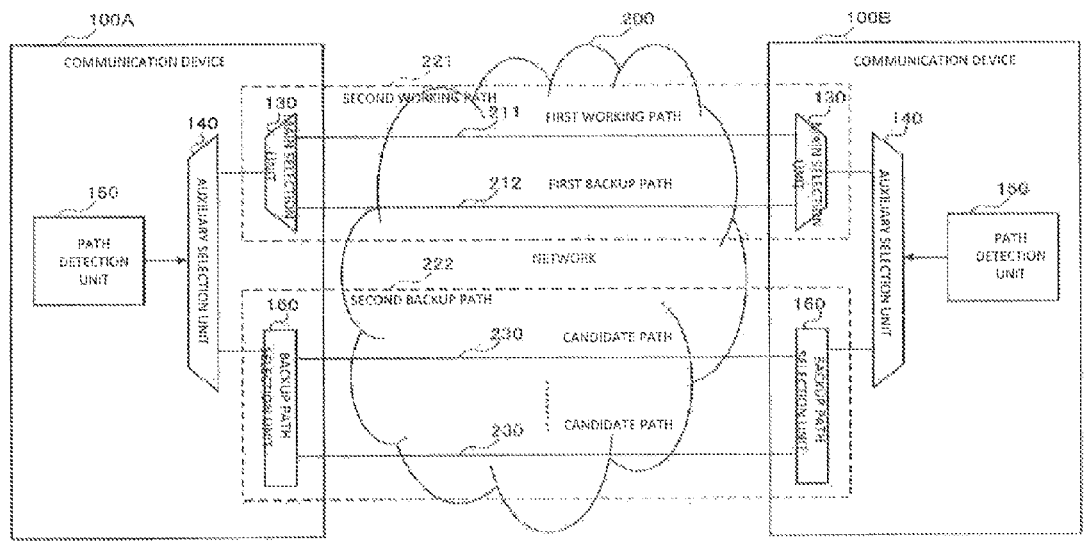
FIG. 9 is a schematic block diagram illustrating a configuration of a communication system according to a second embodiment of the present invention.

FIG. 9 is a schematic block diagram illustrating a configuration of a communication system according to the second embodiment of the present invention.

Unlike the first embodiment, a network 200 in a communication system according to this embodiment includes a plurality of candidate paths 230 as candidates for a second backup path 222. In addition, a communication device 100 includes a backup path selection unit 160 which selects the best performance candidate path 230 from the plurality of candidate paths 230 as a second backup path 222.

Figure 10:
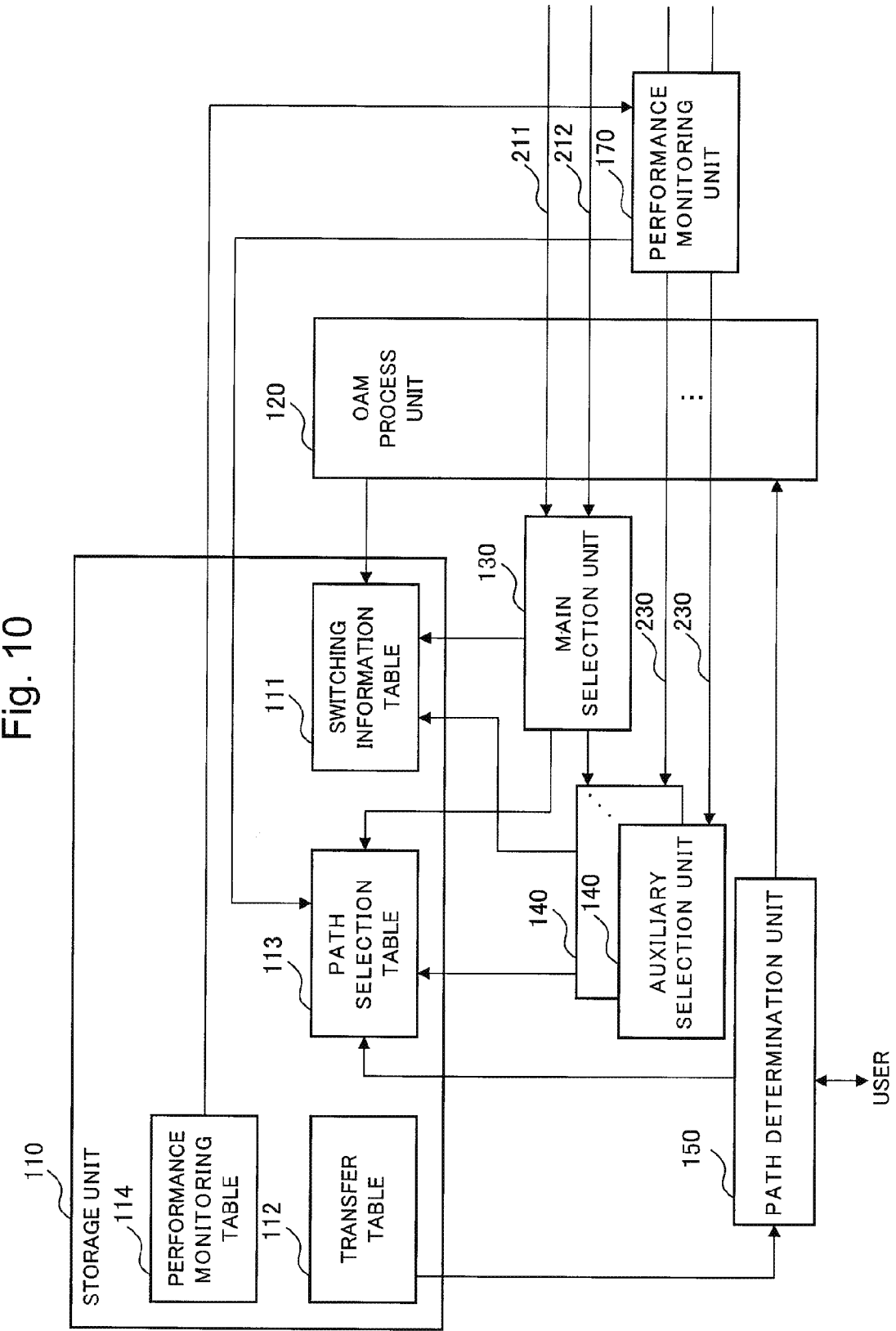
FIG. 10 is a schematic block diagram illustrating a configuration of a communication device according to the second embodiment of the present invention.

FIG. 10 is a schematic block diagram illustrating a configuration of the communication device 100 according to the second embodiment of the present invention.

In addition to the configuration of the first embodiment, the communication device 100 according to the second embodiment further includes a plurality of auxiliary selection units 140 and a performance monitoring unit 170. Furthermore, a storage unit 110 of the second embodiment stores information which is different from that stored in the storage unit 110 of the first embodiment.

The performance monitoring unit 170 measures performance on each of the plurality of candidate paths 230 periodically or on demand. The performance monitoring unit 170 records measurement results in a performance monitoring table 114 stored in the storage unit 110, while updating a path selection table 113.

In addition to the tables stored in the storage unit 110 according to the first embodiment, the storage unit 110 according to the second embodiment stores the performance monitoring table 114.

FIG. 11 represents an example of the performance monitoring table 114 according to the second embodiment of the present invention.

The performance monitoring table 114 stores results of performance measurements made by the performance monitoring unit 170 on the individual candidate paths 230. As shown in FIG. 11, an example of results of the performance measurement includes frame loss rate, delay, delay fluctuation, and utilized bandwidth.

The path selection table 113 stored in the storage unit 110 according to the second embodiment is different from the one according to the first embodiment.

FIG. 12 represents an example of the path determination table 113 according to the second embodiment of the present invention.

As shown in FIG. 12, the path selection table 113 according to the second embodiment stores parameters of "Path (High)" showing the second backup path 222 and of "Path (Low)" showing candidate paths 230 forming the second backup path 222.

Based on the information stored in the performance monitoring table 114, the performance monitoring unit 170 sets "Selection" associated with the best performance "Path (Low)" to "ON" from among "Selection" values associated with "Path (High)" in the path selection table 113. In other words, the performance monitoring unit 170 sets "Selection" to "ON" for the best performance candidate path based on the performance monitoring table 114.

Each of the plurality of auxiliary selection units 140 switches between a combined path up to the previous selection unit (the main selection unit 130 or another auxiliary selection unit 140) and one candidate path 230, according to a protection protocol. At this time, the auxiliary selection unit 140 selects the path whose "Selection" is set to "ON" as the second backup path 222, from among the paths (Low) that are associated with the paths (High) in the path selection table 113. In other words, an auxiliary selection unit 140 selects the best performance path as the second backup path 222. Accordingly, this embodiment implements the backup path selection unit 160 illustrated in FIG. 9 by combining a plurality of auxiliary selection units 140.

As described above, according to this embodiment, a plurality of candidate paths 230 are monitored in terms of performance, and the best performance candidate path 230 is determined to be the second backup path 222. This allows efficient maintenance of the second backup path 222.

While an embodiment of the present invention has been described in detail with reference to the drawings, specific configuration are not limited to the ones described above, and various design changes and the like may be made without departing from the gist of the present invention.

For example, in the second embodiment described above, the backup path selection unit 160 is implemented by a combination of a plurality of auxiliary selection units 140, but this is not a limitation. The backup path selection unit 160 may be implemented in other ways.

In the second embodiment described above, the best performance candidate path 230 of a plurality of candidate paths 230 is used as the second backup path 222, but this is not a limitation. Alternatively, the second backup path 222 may be made up of link aggregation of a plurality of candidate paths 230.

The above-described communication device 100 may contain a computer system. Above-described operations of the individual process units may be stored in a computer-readable record medium in the form of a program, and the above-mentioned processes may be performed in such a way that the computer reads and executes the program. Computer-readable record media may include a magnetic disk, a magneto-optical disk, CD-ROM, DVD-ROM, and semiconductor memory. The computer program may be delivered to a computer via a communication line, and the computer may execute the delivered program.

The above program may be intended for implementing part of the above-described functions.

The above program may be a so-called difference file (difference program), i.e. a program implementing the above-described functions in combination with another program that is already recorded in the computer system.

The whole or part of the exemplary embodiments described above can be described as, but is not limited to, the following supplementary notes.

(Supplementary Note 1)

A communication device communicating with a counterpart device via a working path or any of a plurality of backup paths, the communication device comprising:

a plurality of selection units which select either one of two paths, the plurality of selection units comprising a main selection unit and an auxiliary selection unit being different from the main selection unit; and a path determination unit which determines a path selected by one of the plurality of selection units which has last performed path selection to be a path to be used for communicating with the counterpart device, wherein the main selection unit selects one path from between the working path and one of the plurality of backup paths, and wherein the auxiliary selection unit selects one path from between a path selected by one selection unit of the plurality of selection units and one of the plurality of backup paths, the one selection unit being different from the auxiliary selection unit.

(Supplementary Note 2)

The communication device according to Supplementary Note 1, wherein the number of the backup paths is 2.

(Supplementary Note 3)

A communication device communicating with a counterpart device via a working path, a first backup path, or a second backup path, the communication device comprising:

a main selection unit which selects one path from between the working path and the first backup path;

an auxiliary selection unit which selects one path from between a path selected by the main selection unit and the second backup path; and a path determination unit which determines a path selected by the auxiliary selection unit to be a path to be used for communicating with the counterpart device.

(Supplementary Note 4)

The communication device according to Supplementary Note 3, wherein the main selection unit issues a failure notice to the auxiliary selection unit if a failure occurs on the working path and on the first backup path, and wherein the auxiliary selection unit selects a path based on the failure notice received from the main selection unit.

(Supplementary Note 5)

The communication device according to Supplementary Note 3 or 4, wherein the main selection unit issues a failure recovery notice to the auxiliary selection unit if any of the working path and the first backup path recovers from a situation where a failure has occurred on the working path and on the first backup path, and wherein the auxiliary selection unit selects a path based on the failure recovery notice received from the main selection unit.

(Supplementary Note 6)

The communication device according to any one of Supplementary Notes 3 to 5, further comprising a backup path selection unit, which is connected to a plurality of candidate paths, and monitors performance of the plurality of candidate paths and determines one best performance candidate path of the plurality of candidate paths to be the second backup path.

(Supplementary Note 7)

The communication device according to any one of Supplementary Notes 3 to 5, wherein the second backup path is made up of link aggregation of a plurality of candidate paths.

(Supplementary Note 8)

The communication device according to any one of Supplementary Notes 1 to 7, wherein the main selection unit and the auxiliary selection unit select a path using a 1:1 protection protocol or a 1+1 protection protocol.

(Supplementary Note 9)

A communication system comprising two communication devices being opposite to each other and communicating with each other via a working path or any of a plurality of backup paths, each of the two communication devices comprising:

a plurality of selection units which select either one of two paths, the plurality of selection units comprising a main selection unit and an auxiliary selection unit being different from the main selection unit; and a path determination unit which determines a path selected by one of the plurality of selection units which has last performed path selection to be a path to be used for communicating with an opposite communication device, wherein the main selection unit selects one path from between the working path and one of the plurality of backup paths, and wherein the auxiliary selection unit selects one path from between a path selected by one selection unit of the plurality of selection units and one of the plurality of backup paths, the one selection unit being different from the auxiliary selection unit.

(Supplementary Note 10)

A communication system comprising two communication devices being opposite to each other and communicating with each other via a working path, a first backup path, or a second backup path, each of the two communication devices comprising:

a main selection unit which selects one path from between the working path and the first backup path;

an auxiliary selection unit which selects one path from between a path selected by the main selection unit and the second backup path; and a path determination unit which determines a path selected by the auxiliary selection unit to be a path to be used for communicating with an opposite communication device.

(Supplementary Note 11)

A method for determining a path employing a communication device which communicates with a counterpart device via a working path or any of a plurality of backup paths, the method comprising:

selecting one path from between the working path and one of the plurality of backup paths, the selecting being made by a main selection unit which is one of selection units;

selecting, being made by an auxiliary selection unit which is a selection unit different from the main selection unit, one path from between a path selected by a selection unit being different from the auxiliary selection unit and one of the plurality of backup paths; and determining a path selected by one of the selection units which has last performed path selection to be a path to be used for communicating with the counterpart device.

(Supplementary Note 12)

A method for determining a path employing a communication device which communicates with a counterpart device via a working path, a first backup path, or a second backup path, the method comprising:

selecting one path from between the working path and the first backup path, the selecting being made by a main selection unit;

selecting one path from between a path selected by the main selection unit and the second backup path, the selecting being made by an auxiliary selection unit; and determining a path selected by the auxiliary selection unit to be a path to be used for communicating with the counterpart device.

(Supplementary Note 13)

A program causing a computer for a communication device, which communicates with a counterpart device via a working path or any of a plurality of backup paths, to function as:

a plurality of selection units which select either one of two paths, the plurality of selection units comprising a main selection unit and an auxiliary selection unit being different from the main selection unit; and a path determination unit which determines a path selected by one of the plurality of selection units which has last performed path selection to be a path to be used for communicating with the counterpart device, wherein the main selection unit selects one path from between the working path and one of the plurality of backup paths, and wherein the auxiliary selection unit selects one path from between a path selected by one selection unit of the plurality of selection units and one of the plurality of backup paths, the one selection unit being different from the auxiliary selection unit.

(Supplementary Note 14)

A program causing a computer for a communication device, which communicates with a counterpart device via a working path, a first backup path, or a second backup path, to function as:

a main selection unit which selects one path from between the working path and the first backup path;

an auxiliary selection unit which selects one path from between a path selected by the main selection unit and the second backup path; and a path determination unit which determines a path selected by the auxiliary selection unit to be a path to be used for communicating with the counterpart device.

This application claims priority based on Japanese Patent Application No. 2012-165748 filed on Jul. 26, 2012, the entire disclosure of which is herein incorporated.

INDUSTRIAL APPLICABILITY

The present invention may be applied to a communication device, a communication system, a method for determining a path, and a program, which are for communicating with a counterpart device via a working path or any of a plurality of backup paths.

REFERENCE SIGNS LIST

100 Communication device
110 Storage unit
111 Switching information table
112 Transfer table
113 Path selection table
114 Performance monitoring table
120 OAM process unit
130 Main selection unit
140 Auxiliary selection unit
150 Path determination unit
160 Backup path selection unit
170 Performance monitoring unit
200 Network
211 First working path
212 First backup path
221 Second working path
222 Second backup path
230 Candidate path

The invention claimed is:

1. A communication device connected with a counterpart device using at least two backup paths for one working path, the communication device comprising:
 a main selection processor that is connected to a first working path and to a first backup path, a combination of the first working path and the first backup path being treated as a second working path, the main selection processor being configured to:
  select, using a protection protocol including 1+1 protection or 1:1 protection for path selection among three or more paths, one of the first working path and the first backup path as a transfer path based on a status given to the first working path and the first backup path,
  perform path switching according to the protection protocol which switches between the first working path and the first backup path,
  issue a failure notice of the second working path upon detection of a failure on both the first working path and the first backup path, and
  issue a failure recovery notice of the second working path upon recovery from the failure on either the first working path or the first backup path is detected;
 an auxiliary selection processor that is connected to a second backup path and to the main selection processor including the second working path, the auxiliary selection processor being configured to:
  select, using the protection protocol including 1+1 protection or 1:1 protection for path selection among three or more paths, the second working path when determining no failure occurring on the second working path,
  select, using the protection protocol including 1+1 protection or 1:1 protection for path selection among three or more paths, the second backup path when the failure notice is issued by the main selection processor,
  select, using the protection protocol including 1+1 protection or 1:1 protection for path selection among three or more paths, the second working path when the main selection processor has issued the failure recovery notice after issuance of the failure notice, and
  perform path switching between the second working path and the second backup path according to the protection protocol; and
 a path determination processor configured to determine a path selected by the auxiliary selection processor to serve as the transfer path to be used for communicating with the counterpart device.

2. The communication device according to claim 1, further comprising
 a backup path selection processor that is connected to a plurality of candidate paths and is configured to
  monitor performance of the plurality of candidate paths to determine a best performance candidate path of the plurality of candidate paths to be the second backup path based on the monitored performance,
 wherein the auxiliary selection processor is connected to the backup path selection processor and to the main selection processor, and the auxiliary selection processor is configured to, based on a failure state on the second working path, perform path switching, according to the protection protocol, between the second working path and the second backup path determined as the best performance candidate path.

3. A method for determining a path in a communication device which is connected with a counterpart device using at least two backup paths for one working path, the method comprising:
 providing a first combination of a first working path and a first backup path wherein the first combination is regarded as a second working path, including:
  selecting, using a protection protocol including 1+1 protection or 1:1 protection for path selection among three or more paths, one of the first working path and the first backup path as a transfer path based on a status given to the first working path and the first backup path,
  performing path switching according to the protection protocol, including 1+1 protection or 1:1 protection for path selection among three or more paths, which switches between the first working path and the first backup path,
  issuing a failure notice of the second working path upon detection of a failure on both the first working path and the first backup path, and
  issuing a failure recovery notice of the second working path upon recovery from the failure on either the first working path or the first backup path is detected;
 providing a second combination of the second working path and a second backup path, including:
  selecting, using the protection protocol including 1+1 protection or 1:1 protection for path selection among three or more paths, the second working path when determining no failure occurring on the second working path, selecting, using the protection protocol including 1+1 protection or 1:1 protection for path selection among three or more paths, the second backup path when the failure notice is issued, and selecting, using the protection protocol including 1+1 protection or 1:1 protection for path selection among three or more paths, the second working path when the failure recovery notice is issued after issuance of the failure notice, and performing path switching in the second combination of the second working path and the second backup path according to the protection protocol; and determining a path selected in the second combination to serve as the transfer path to be used for communicating with the counterpart device.

4. The method according to claim 3, further comprising:

providing a plurality of candidate paths as the second backup path;

providing the second combination of the second working path and the second backup path including the plurality of candidate paths;

monitoring performance on each of the plurality of candidate paths to determine one best performance candidate path among the plurality of candidate paths based on the monitored performance; and based on a failure state on the second working path, performing path switching, according to the protection protocol, between the second working path and the second backup path determined as the best performance candidate path.

* * * * *